(12) United States Patent
Ragnet et al.

(10) Patent No.: US 8,453,922 B2
(45) Date of Patent: Jun. 4, 2013

(54) METHOD FOR ONE-STEP DOCUMENT CATEGORIZATION AND SEPARATION USING STAMPED MACHINE RECOGNIZABLE PATTERNS

(75) Inventors: Francois Ragnet, Venon (FR); John A. Moore, Victor, NY (US); Nicolas Raphaël Saubat, Sainte-Geneviève-des-bois (FR); Eric H. Cheminot, Meylan (FR); Thierry Lehoux, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 83 days.

(21) Appl. No.: 12/702,897

(22) Filed: Feb. 9, 2010

(65) Prior Publication Data

US 2011/0192894 A1    Aug. 11, 2011

(51) Int. Cl.
*G06F 17/00* (2006.01)
*G06K 19/06* (2006.01)

(52) U.S. Cl.
USPC .......................................... 235/375; 235/494

(58) Field of Classification Search
USPC ................................. 235/375, 494
See application file for complete search history.

(56) References Cited

U.S. PATENT DOCUMENTS

| | | | |
|---|---|---|---|
| 4,716,438 A | 12/1987 | Farrell | |
| 4,728,984 A | 3/1988 | Daniele | |
| 4,757,348 A | 7/1988 | Rourke et al. | |
| 4,776,464 A * | 10/1988 | Miller et al. | 209/3.3 |
| 4,970,554 A | 11/1990 | Rourke | |
| 5,060,980 A | 10/1991 | Johnson et al. | |
| 5,091,966 A | 2/1992 | Bloomberg et al. | |
| 5,128,525 A | 7/1992 | Stearns et al. | |
| 5,157,726 A | 10/1992 | Merkle et al. | |
| 5,168,147 A | 12/1992 | Bloomberg | |
| 5,221,833 A | 6/1993 | Hecht | |
| 5,245,165 A | 9/1993 | Zhang | |
| 5,278,400 A | 1/1994 | Appel | |
| 5,315,098 A | 5/1994 | Tow | |
| 5,317,646 A | 5/1994 | Sang, Jr. et al. | |
| 5,448,375 A | 9/1995 | Cooper et al. | |
| 5,449,895 A | 9/1995 | Hecht et al. | |
| 5,449,896 A | 9/1995 | Hecht et al. | |
| 5,453,605 A | 9/1995 | Hecht et al. | |
| 5,489,763 A | 2/1996 | Conrad et al. | |
| 5,503,380 A * | 4/1996 | Hidding | 270/58.02 |

(Continued)

OTHER PUBLICATIONS

FSI Automation Data Sheet, XReader™ Vision System, http://www.fsiautomation.com/Downloads/XReader%20Datasheet%20.pdf, accessed Feb. 9, 2010.

*Primary Examiner* — Thien M Le
*Assistant Examiner* — Toan Ly
(74) *Attorney, Agent, or Firm* — Fay Sharpe LLP (57) ABSTRACT

A method for separating and categorizing documents includes receiving a scanned batch of documents. The batch includes scanned documents to which document separator stamps have been applied before scanning. Each stamp includes machine recognizable patterns applied on a same page of a document, spaced by a designated field for receiving a user-applied category code. The scanned batch of documents is processed to identify pages that contain a document separator, including identifying at least one of two spaced patterns. For a document page for which a document separator is identified, the the corresponding designated field is located and the category code associated with the designated field identified. The document containing the is separated from other documents in the batch based the identified separator and a document category is assigned to the document, based on the identified category code.

19 Claims, 5 Drawing Sheets

U.S. PATENT DOCUMENTS

| | | |
|---|---|---|
| 5,521,372 A | 5/1996 | Hecht et al. |
| 5,537,223 A | 7/1996 | Curry |
| 5,572,010 A | 11/1996 | Petrie |
| 5,576,532 A | 11/1996 | Hecht |
| 5,611,575 A | 3/1997 | Petrie |
| 5,682,540 A | 10/1997 | Klotz et al. |
| 5,684,885 A | 11/1997 | Cass et al. |
| 5,706,099 A | 1/1998 | Curry |
| 5,717,197 A | 2/1998 | Petrie |
| 5,761,686 A | 6/1998 | Bloomberg |
| 5,771,245 A | 6/1998 | Zhang |
| 5,923,792 A * | 7/1999 | Shyu et al. .................. 382/309 |
| 6,298,171 B1 | 10/2001 | Lorton et al. |
| 6,457,651 B2 | 10/2002 | Paul et al. |
| 6,494,375 B1 * | 12/2002 | Ishibashi et al. ......... 235/462.11 |
| 7,293,712 B2 * | 11/2007 | Wang ....................... 235/462.01 |
| 2007/0168382 A1 * | 7/2007 | Tillberg et al. ................ 707/102 |
| 2008/0148970 A1 * | 6/2008 | Chen et al. ..................... 101/212 |
| 2009/0200792 A1 | 8/2009 | Iftime et al. |
| 2009/0218391 A1 * | 9/2009 | He ................................. 235/375 |

* cited by examiner

METHOD FOR ONE-STEP DOCUMENT CATEGORIZATION AND SEPARATION USING STAMPED MACHINE RECOGNIZABLE PATTERNS

BACKGROUND

The exemplary embodiment relates to document processing. It finds particular application in connection with the application of machine readable indicia to hardcopy documents which facilitate processing of the documents once scanned.

Mailrooms of large organizations, such as corporations, government entities, and the like receive large quantities of mail which has to be opened, scanned, and delivered to appropriate personnel for processing. Documents can be much more difficult to manipulate in electronic format than paper (due to latency, viewing order, lack of envelope context, and the like). Consequently, during the preparation stage, the operators perform some pre-analysis of the document, typically to put the most important page in front. Specific documents may be extracted from the flow before scanning, and this sometimes involves reading the full document. For example, documents coming with a payment check may need to be extracted from the flow. Sensitive or urgent documents may also be separated out and handled by a different process.

Document preparation is one of the most labor-intensive and therefore expensive steps in most digital mailrooms. Typically, as mail is opened, preparation operators may mark each hardcopy document with a document category (e.g., a number) and circle it, so that it can later be read by another human operator (e.g., on a computer monitor) and directly indexed without that operator having to also read/understand the document. The preparation operator also inserts a slip sheet between each document, or each group of documents from the same envelope or folder, prior to scanning so that scanning can be performed efficiently in large batches. In some cases, the slip sheets include preprinted category information, but it can be time consuming for the operator to find the correct slip sheet. Later in the workflow, these slip sheets are automatically detected and the documents separated.

INCORPORATION BY REFERENCE

The following references, the disclosures of which are incorporated herein in their entireties by reference, are mentioned:

U.S. Pat. No. 6,457,651, issued Oct. 1, 2002, entitled DUAL MODE, DUAL INFORMATION, DOCUMENT BAR CODING AND READING SYSTEM, by Paul, et al., discloses a dual level encryption method. A second and very much finer pattern of encoded optically machine readable glyph code or other such indicia is printed within a bar code pattern area to provide two different levels of information within the same area. Scanning the bar code pattern with a conventional bar code reader extracts conventional bar coded information embedded in the bar code without interference from the second indicia. Scanning the same bar code pattern area with a different, higher resolution, optical scanner extracts the much greater amount of information from the second, much finer, optically readable indicia pattern.

U.S. Pat. No. 5,682,540, issued Oct. 28, 1997, entitled SYSTEM FOR REPRESENTING ELECTRONIC FILES USING A PAPER BASED MEDIUM, by Klotz, et al., discloses a document surrogate including at least one sheet of an information-storing substrate material that has a human readable area and a machine readable area. The human readable area may contain at least one area of material which summarizes the associated object. Such a summary may either be made manually by the user or created automatically by the document processing system. The machine readable area comprises a document reference code that is readable and recognizable by the document processing system. The code is located by the system and recognized from an image of the entire page. The reference code encodes an indicator to the storage location of the associated object.

U.S. Pub. No. 2009/0200792, published Aug. 13, 2009, entitled DOCUMENT WITH INVISIBLE ENCODED INFORMATION AND METHOD OF MAKING THE SAME, by Gabriel Mime, et al., discloses a document including a paper substrate which includes encoded information printed thereon, and wherein the encoded information is printed with an ink comprising light absorbing material that absorbs light only at wavelengths below 350 nm and an optional clear binder in a solvent.

The following references relate generally to the incorporation of glyphs in documents: U.S. Pat. Nos. 4,716,438; 4,728,984; 4,757,348; 4,970,554; 5,060,980, 5,091,966; 5,128,525; 5,157,726; 5,168,147; 5,221,833; 5,245,165; 5,278,400; 5,315,098; 5,317,646; 5,448,375; 5,449,895; 5,449,896; 5,453,605; 5,489,763; 5,521,372; 5,537,223; 5,572,010; 5,576,532; 5,611,575; 5,682,540; 5,684,885; 5,706,099; 5,717,197; 5,761,686; 5,771,245; 6,298,171; and U.S. Pub No. 2008/0148970.

BRIEF DESCRIPTION

In accordance with one aspect of the exemplary embodiment, a method for separating and categorizing documents includes receiving a scanned batch of documents. The batch includes a plurality of scanned documents to which document separator stamps have been applied before scanning. Each document separator stamp includes first and second machine recognizable patterns applied on a same page of a document. The first and second patterns are spaced by a designated field for receiving a user-applied category code. The method further includes processing the scanned batch of documents to identify pages that contain a document separator. The processing includes identifying at least one of the first and second spaced patterns. For each of a plurality of document pages for which a respective document separator is identified, the method includes locating the corresponding designated field and identifying the category code associated with the designated field. The document containing the identified separator is separated from other documents in the scanned batch based on at least the identified separator. A document category from a set of document categories is assigned to the document, based on the identified category code. One or more of the steps may be computer implemented.

In accordance with another aspect of the exemplary embodiment, an apparatus for separating and categorizing documents includes memory which stores a batch of scanned documents. A separator detector detects document separators on pages of the scanned documents, separator stamps having been applied to original hardcopy documents prior to scanning them to form the batch of scanned documents. Each of the separator stamps includes unique left and right portions spaced by a designated field for receiving a user applied category code. A region detector is provided for locating the designated field based on the output of the separator detector. A category detector assigns a category to each document based on code information extracted from the located designated field of a respective separator.

In accordance with another aspect of the exemplary embodiment, a method for separating and categorizing documents. The method includes providing a stamping device for applying a stamp to original documents, the stamp comprising first and second different machine recognizable patterns spaced by a designated field for receiving a user-applied category code or a single machine readable pattern adjacent markings identifying a boundary for the designated field, such that when the stamp is applied to a page of each of a batch of original documents, a category code applied by a user in the respective designated region, and the documents scanned, the documents in the scanned batch are separable solely by identification of at least one of the patterns for each successive document. Also, document categories are assignable to each of the separated documents based on a machine reading of the respective category codes.

In another aspect, a hardcopy document includes a plurality of pages of print media and a stamp serving as a document separator, the stamp having been applied to only a single page of the document with a stamping device after the document's creation. The stamp includes different first and second machine recognizable patterns spaced by a designated field for receiving a user-applied category code based on a reading of at least part of the document. Accordingly, when a batch of original documents comprising the hardcopy document, each with a category code applied by a user in the respective designated region, are scanned as a batch, the documents in the scanned batch are separable simply by identification of at least one of the patterns for each successive document after the first document, and document categories are assignable to each of the separated documents based on a machine reading of the respective category codes.

DETAILED DESCRIPTION

Aspects of the exemplary embodiment relate to a method, a system, and an apparatus which enable combining document separation and classification tasks into one step. The method uses a document stamp with subsequent image processing to achieve a more automated, and hence lower cost, solution than conventional document handling approaches.

The method is described in the context of a digital mailroom where documents comprise the contents of envelopes received by the mailroom. However, it is contemplated that the method may be applied to other documents which are converted to digital format in bulk and which are categorized prior to optical scanning.

Figure 1:
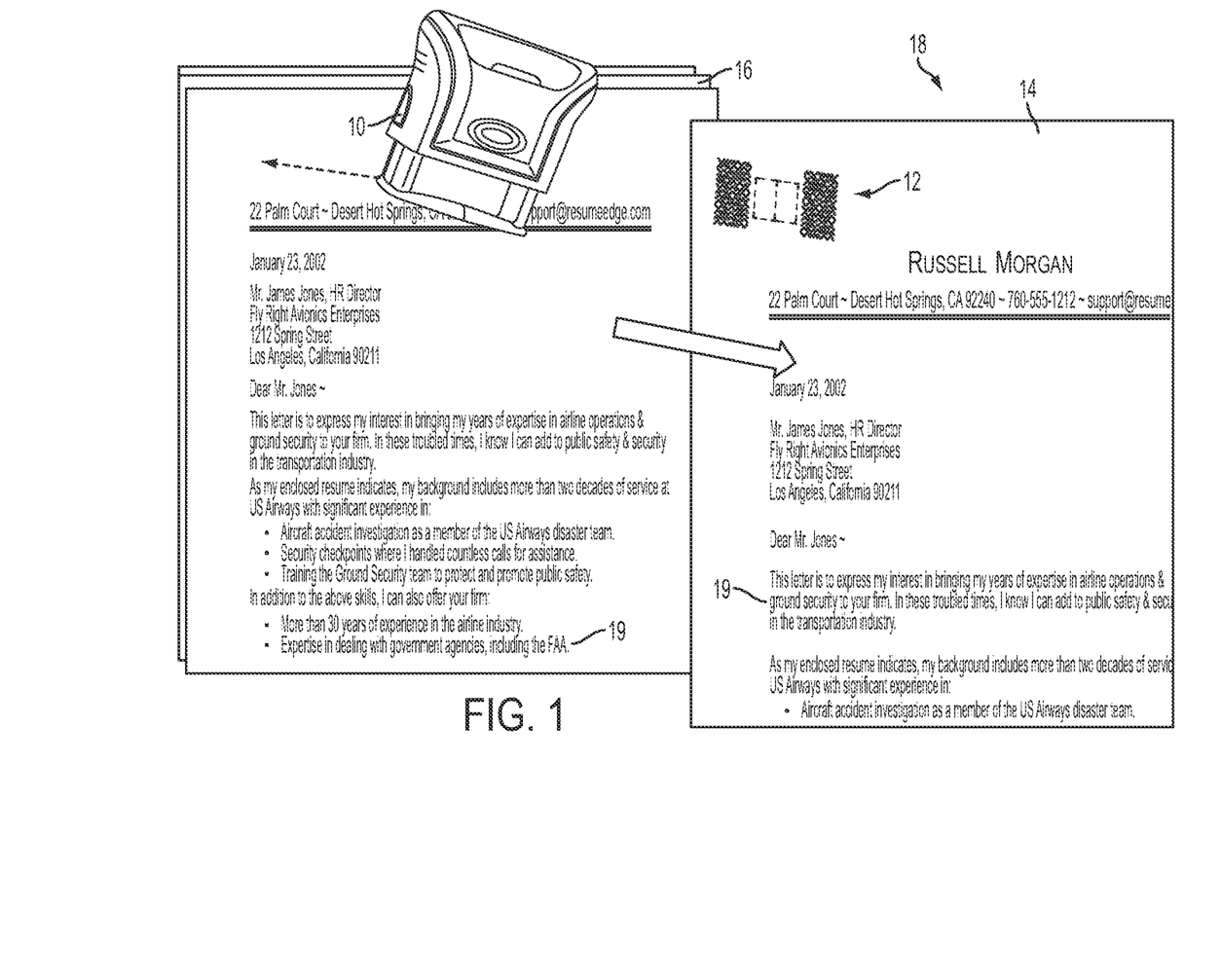
FIG. 1 is a perspective view of unstamped and stamped documents and a stamping device in accordance with one aspect of the exemplary embodiment.

As illustrated in FIG. 1, a hand-held document stamping device 10 is provided which can be used by an operator to print a stamp 12 on a single page 14 of a hardcopy document 16 to generate a stamped hardcopy document 18. The stamp serves as a document separator when a batch of documents is scanned. The hardcopy document generally includes text 19, which may be printed, handwritten, or a combination thereof on print media, such as one or more sheets of paper. Examples of hardcopy documents include invoices, payment checks, letters, payment slips, administrative forms, combinations thereof, and the like. The contents of an envelope or folder may be treated as a single document 16 for processing or may be subdivided into two or more documents.

Figure 2:
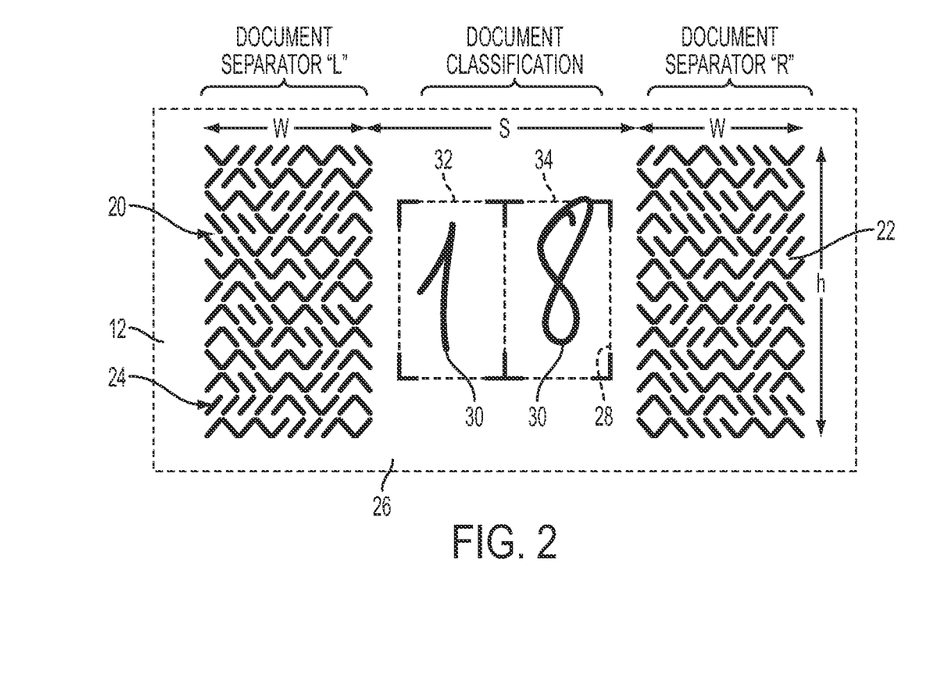
FIG. 2 is an enlarged top plan view of an applied and marked stamp.

The exemplary stamping device 10 has an internal reservoir, such as a sponge, which holds a marking material such as ink, for forming the stamp 12. Alternatively, the ink can be applied to the device 10 from a conventional inkpad. The exemplary stamping device 10 includes two spaced relief blocks (not shown) which each define a respective pattern 20, 22 comprising machine recognizable indicia forming a code, as shown in FIG. 2. The operator simply places the device 10 on the hardcopy page 14 and applies pressure to the top, as with a conventional hand stamp. The relief blocks are brought into contact with the paper and imprint the ink patterns 20, 22 thereon. The construction of the stamping device 10 can differ from that shown, which is intended only for illustration.

The patterns 20, 22 may be, for example, from about 0.5-2 cm in each dimension (e.g., 1 cm×1.5 cm). Since both patterns 20, 22 are formed by the same device 10 concurrently, the patterns are applied to the same side of the page 14 (e.g., the top surface) with a fixed spacing s between them. The spacing s between the patterns is generally up to about four times a width w of each stamp pattern, e.g., s is at least 1 cm and can be up to about 8 cm. In this way, the left and right patterns 20, 22 provide a clear boundary for a designated area 26 by defining its left and right edges. The patterns 20, 22 may comprise blocks of the same height h and width w. A ratio of height to width (h:w) can be, for example, from about 3:1 to 1:3, e.g., from 2:1 to 1:2. In the exemplary embodiment, h>w. The height h of the patterns defines the upper and lower boundaries of the designated area 26. The pattern blocks 20, 22 may be arranged in parallel such that spacing s is uniform in the height direction of the patterns.

One or both of the patterns 20, 22 can be a Dataglyph (Glyphstamp) pattern, a Data Matrix pattern or other two-dimensional barcode, a barcode, or a combination thereof. Since each pattern 20, 22 needs to carry very little information (i.e., that it is an "L" or "R" stamp), there can be considerable redundancy using Data Matrix or Dataglyph patterns.

Dataglyph patterns of the type illustrated in FIG. 2 generally encode information into very small, individual glyph elements 24. Each element 24 may consist of a small 45 degree diagonal line, about 0.025 cm-0.2 cm in length, or less, depending on the resolution of the scanning device that is used. Scanners can typically detect 200-300 spots per inch. Each line 24 represents a single binary 0 or 1, depending on whether it slopes to the left or right. Sequences of these lines can be used to encode numeric, textual, or other information. In the exemplary embodiment, the elements in each pattern 20, 22 slope at the same two angles from horizontal (+ and −45 degrees in the illustrated embodiment). A Dataglyph pattern is easily detected since it has a "find glyph" component. Once found, the code it contains ("L" or "R" in the present case) can then be decoded. The exemplary patterns are of the same size and differ only in the sequence of the 0 and 1 elements.

A Data Matrix pattern is a two-dimensional matrix barcode consisting of black and white "cells" or modules arranged in a square or rectangular block. Examples of other two-dimensional barcodes which may be used herein are QR codes, Aztec codes, PDF-417 codes, and the like.

As an alternative to a Dataglyph pattern, Data Matrix pattern or barcode, an OCR-readable code could be used. For example, for one or both of the patterns, a simple, unique text string could be used, with OCR (Optical character recognition) employed to detect it. However, alphanumeric sequence detection tends to be subject to skew, whereas Dataglyph patterns, having only lines in two directions, can easily be deskewed and/or extracted.

As illustrated in FIG. 2, the left and right patterns 20, 22 are spaced by a designated field 26. The field 26 can be rectangular in shape and appear substantially blank (free of stamp ink) when the stamp 12 is applied to a hardcopy document 16, apart from optional designation marks 28 which define bounding boxes 32, 34 (shown in phantom) for the handwritten characters. An operator writes or otherwise marks a category code 30 in the designated field 26, e.g., generally within the bounding boxes defined by the designation marks 28. The category code 30 may be a two digit number (here, the category number 18) or other alphanumeric code which designates the category to which the entire document (i.e., all pages until the page preceding the next stamp) is being assigned.

The assigned category may be based on the operator's reading of the document. The category number or other code 30 may correspond to a department which handles that type of document. For example complaint letters may be assigned a first category number code corresponding to a department which handles complaints. Documents referring to contract cancellation or termination may be assigned a second category number code corresponding to a department which handles contract terminations, and so forth. Thus, since documents for different departments are mixed together in the same batch of documents, several different codes may be used for assigning different one(s) of the documents to respective categories selected from a predefined set of categories. In processing a set of documents to be scanned, each document processed by the operator is stamped with the same stamp 12, whose location can be any convenient location on the page, such as in a white space. Each stamp receives a special user-applied category mark(s) 30.

While in the exemplary embodiment, the stamp 12 is shown placed on the front (first) page 14 of a hardcopy document 16 (corresponding to the first page to be scanned), in other embodiments, it may be placed on another predetermined page, such as the second page (back of first page) or last page of the document 16. However, only a single separator stamp 12 needs to be applied to each document. Moreover, while a stamping device 10 is a convenient method for applying the stamp 12, other devices, such as a mobile printer or label applying machine could be used for applying the stamp 12.

As can be seen from FIG. 1, there is a tendency for the stamp 12 to be applied in an other than horizontal orientation, and thus the use of the terms "L" and "R" herein to describe the patterns 20, 22 does not imply that the L pattern 20 will necessarily be to the left of the R pattern 22 on the page.

While in the exemplary embodiment, each stamp includes only two patterns 20, 22, it is also contemplated that there may be more than two patterns, such as three or four patterns provided by a single stamping device 10. For example, a third pattern could be positioned above the designated area 26 and/or a fourth pattern could be placed below it. Further, it is also contemplated that there may be fewer than two patterns, i.e., a single pattern 20 or 22. In this case, the boundaries of the designated area which are not defined by a pattern should be clearly marked by marks 28.

Figure 3:
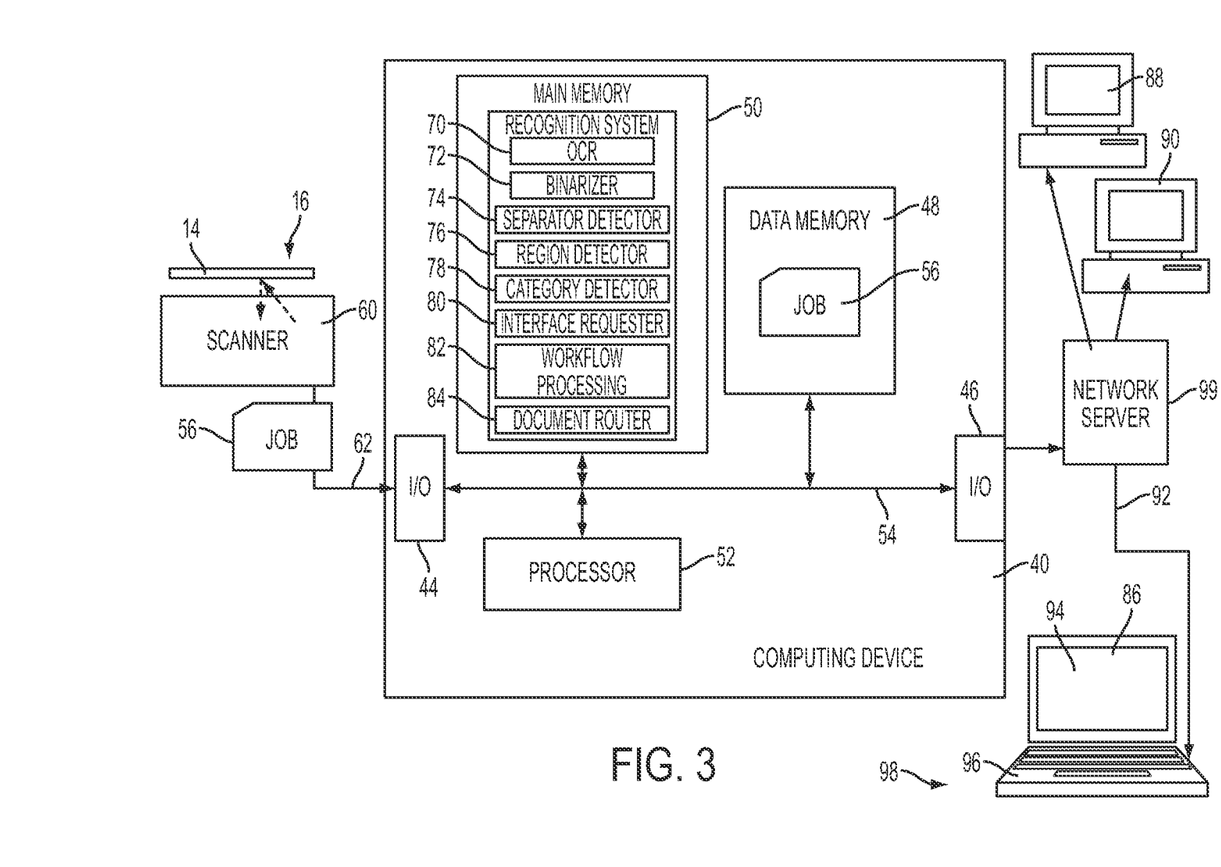
FIG. 3 is a functional block diagram of an apparatus hosting a system for separating documents and identifying assigned categories.

FIG. 3 is a functional block diagram of an apparatus 40 hosting a recognition system 42 which may be used, together with the stamping device 10, in performing part of the method described below with reference to FIGS. 4 and 5. The illustrated apparatus 40 includes one or more inputs/outputs 44, 46, for communicating with external devices, as well as data memory 48, main memory 50, and a digital processor 52, all connected by a data/control bus 54. Apparatus 40 may be take the form of one or more computing devices, such as a general purpose computer or dedicated computing device, such as a desktop or laptop computer, PDA, web-based server, network server, or the like. The exemplary processor 52 controls the overall operation of the computer device 40 by execution of processing instructions which are stored in memory 50 connected to the processor.

Recognition system 42 may be in the form of hardware or a combination of hardware and software. In the exemplary embodiment, memory 50 stores the recognition system as software instructions which are executed by processor 52.

The memory 48, 50 can include random access memory (RAM), read-only memory (ROM), a hard disk, optical disk, combinations thereof, and the like, and may be physically located in the same computing device or parts thereof may be accessible to the computing device, e.g., via a local area network or the Internet.

The digital processor 52 can be variously embodied, such as by a single-core processor, a dual-core processor (or more generally by a multiple-core processor), a digital processor and cooperating math coprocessor, a digital controller, or the like.

Jobs 56 to be processed by system 42 are received by input 44 from a suitable source 60, such as a scanner, camera, data storage device, or the like via a wired or wireless link 62 and may be stored in a volatile portion of memory 48 during processing. Each job 56 may include a batch of scanned stamped documents 18. The illustrated scanner 60 is separate from the apparatus 40. In another embodiment, apparatus 40 forms a part of the scanning device 60.

In a typical optical scanner 60, a document sheet page 14 is illuminated with light from a light source and the light reflected from the document sheet is recorded by a photosensitive device such as a CCD (charge coupled device) or CMOS (complementary metal oxide semiconductor) array, to be converted to digital image data. In one embodiment, a narrow strip of the document sheet is illuminated as the sheet is moved through a document handler, or the photosensitive device is moved relative to a platen on which the document sheet is placed.

The system 42 may include an optical character recognition (OCR) processor 70, e.g., stored in memory 50 and executed by processor 52. The OCR processor may be used for identifying words in the scanned document pages and optionally also for reading the code 30. Alternatively, the scanned document pages in the job 56 may be OCR processed elsewhere, prior to input to the system, e.g., by scanner 60.

The exemplary system 42 includes various processing components 72, 74, 76, 78, 80, 82, 84 which operate on an input scanned job 56. Components 70, 72, 74, 76, 78, 80, 82, 84 may be in the form of hardware or software and may operate on the output of a prior one of the components. In the illustrated embodiment, these components are in the form of software instructions stored in memory 48 which are executed by the processor 52. As will be appreciated one or more components may be combined or split into separate components. These components are best understood with reference to the method and are only briefly described here.

Optionally, a binarizer 72 converts each of the input gray level images forming the document pages into a binary image in which each pixel of the image is either black or white. In general, black pixels are the pixels of interest, however, in a reverse image, the white pixels may be the ones considered. The binarizer can be omitted if the output of the scanner is binary.

A separator detector 74 detects the presence and location of a document separator 12 by detection of one or both of the "L" and "R" patterns 20, 22 on the same scanned page. The content of each scanned document 16 in the batch (except for the last) is thus separable by identifying a pair of pages comprising separator stamps 12, one on the first page of the document, and one on the first page of the next document. For the last document in the batch, the document is defined by one separator stamp 12 on its first page and the last page of the batch.

Based on the computed location(s) of the detected patterns 20, 22, and/or information conveyed by the Dataglyph or Data Matrix code, the coordinates of a designated field 26 can be computed by the region detector 76.

The category detector 78 performs character recognition on the content of the computed region 26 (e.g., by examining the distribution of black pixels therein) and outputs a category for the respective document 16 of the batch. The category detector 78 may include ICR (intelligent character recognition) software. In some embodiments, the detector 78 may include a classifier trained on handwritten and/or typed samples of the category codes. For example, the classifier may be input with scanned, handwritten samples of the possible category codes, e.g., samples of each of the two-digit codes. Each scanned sample has an associated user-applied label, here the corresponding category number. The detector 78 uses the trained classifier and outputs the code computed to be most similar to the handwritten code.

The interface requester 80 outputs the document to a graphical user interface (GUI) 86 for review of the document by a person. This may be initiated, for example, if the code 30 cannot be determined with at least a threshold confidence level. Once the categories for each of the documents in the job 54 have been identified, either automatically or with the aid of an operator, the separated documents may undergo workflow processing by a workflow processor 82. The separated digital documents are subsequently routed by document router 84, based on the respective assigned categories, to appropriate locations. For example, the documents may be routed to client devices 88, 90 assigned to processing personnel in different departments or stored in appropriate locations in data storage devices from which they can be retrieved by the right people, or the like.

For facilitating user interaction with the system, the apparatus 40 may be linked to the GUI 86 via a wired or wireless link 92, such as a cable, network connection, telephone line, or a wide area network, such as the Internet. GUI 86 includes a display 94, such as an LCD screen or computer monitor and a user input device 96. Suitable input devices 96 may include a keyboard, keypad, touch screen, cursor control device, or combination thereof. An operator may use the input device for entering missing category codes or codes that are unreadable by the system. The operator may also spot missing document separators and input that information with the input device 96. The GUI may also allow a reviewer to assess the accuracy of the system 42 in categorizing documents by recognition of the marks 30 therein, e.g., by reviewing scanned documents 16, or portions thereof, on the screen. The exemplary GUI 86 may be hosted by a client computing device 98 or may be hosted by computer 40. In the exemplary embodiment, a network server 99 links the system 42 to external devices 86, 88, 98, although other links are contemplated.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 4:
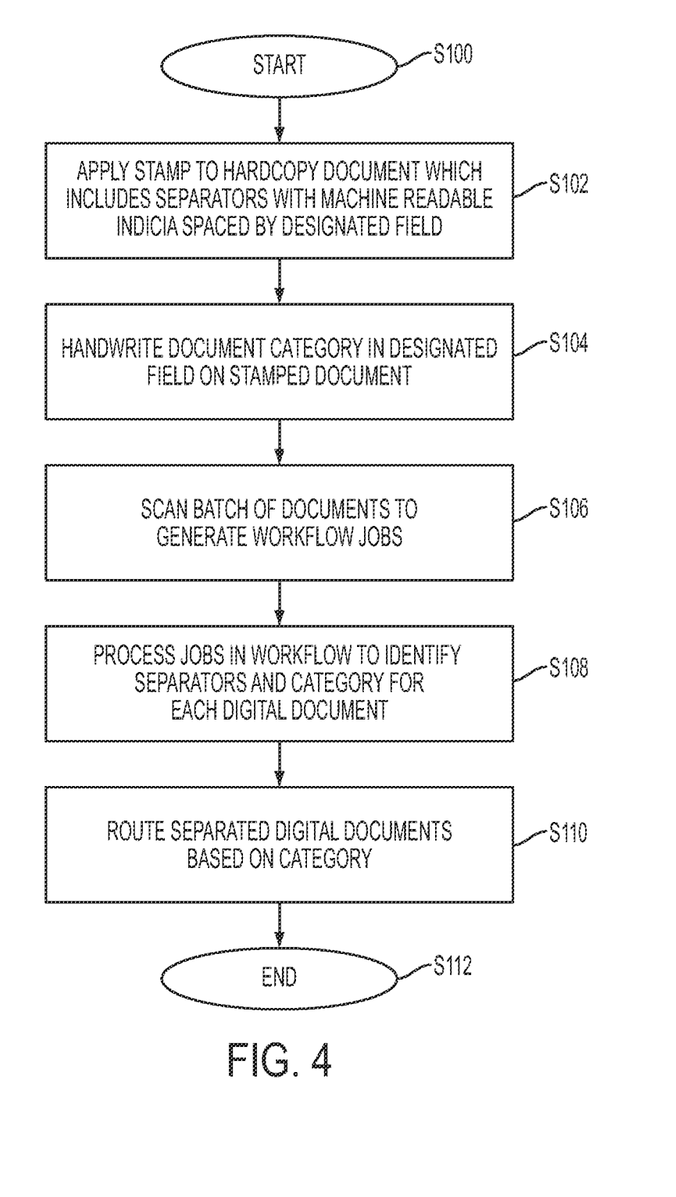
FIG. 4 illustrates a method for document categorization and separation.

FIG. 4 illustrates a method of categorizing and segregating documents which may be performed using the illustrated stamping device 10. The method begins at S100. At S102, a stamp 12 is applied to a page 14 of a hardcopy document 16, e.g., by a mailroom operator. For example, the preparation officer stamps the first page 14 of the document 16. The stamp 12 provides for document separation so that slip sheets are no longer needed and provides a standard location 26 where document classification can be marked.

At S104, the operator marks the designated space, 26 e.g., with a handwritten 2-digit code 30 for the appropriate document category.

At S106, the operator assembles a batch of the stamped documents 18, without adding any spacer pages between the documents, and scans the batch of documents with an optical scanner 60 to generate a digital file or "job" 56 comprising several such documents, such as from 10 to 100 or more documents. The job 56 may be in any suitable form, such as a PDF, TIFF, JPEG file or the like. Each scanned document in the batch includes one or more pages. At least some of the documents include multiple scanned pages such that only a portion of the scanned pages include a document separator resulting from a stamp 12.

At S108, the job 56 is received into a workflow process and the category of each document and spacing between successive documents is identified, based on an identification and analysis of the stamps 12 detected, as described in further detail below with reference to FIG. 5. At S110, the separated documents are optionally processed further in the workflow, e.g., OCR processed, and then routed to a destination based on the identified category.

The method ends at S112.

Figure 5:
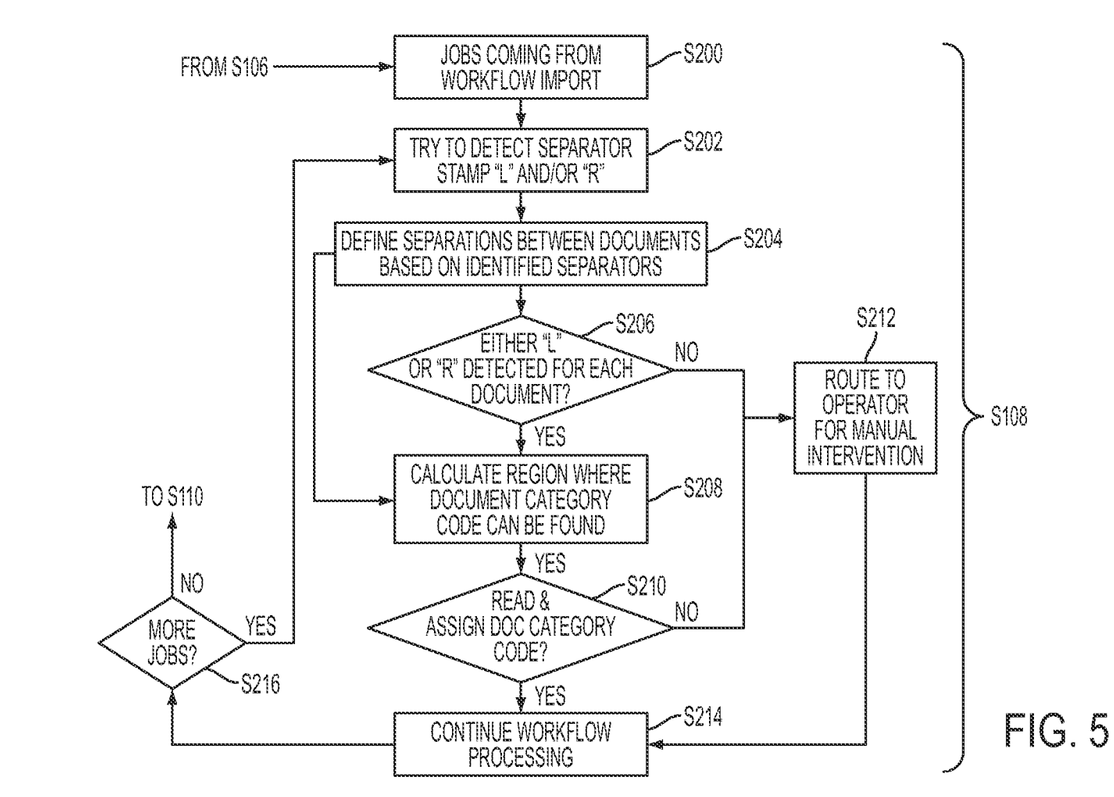
FIG. 5 illustrates an automated or semi-automated part of the exemplary method of FIG. 4.

FIG. 5 illustrates further aspects of S108. Subsequent to the bulk scanning step (S106), the documents are imported into a workflow system at S200. At S202, the scanned job 56 is automatically processed to detect the "L" & "R" separator portions 20, 22 of the document separators derived from stamps 12. There may be scanned several pages with separator stamps 12 on them, each corresponding to the start of a new document. Specifically, an algorithm is applied to scanned data in the job which is capable of detecting either one or both of the separator portions 20, 22 on a same scanned page. In the exemplary embodiment, it is not necessary for both separator portions 20, 22 to be detected.

In general, the stamp blocks 20, 22 include some redundant information, which allows detection even if the scanned separator portion 20, 22 is partially missing or obscured, e.g., because the stamp 12 has been placed over text or other marks on the original document page or arising from marks due to scanning errors. Methods for detecting and analyzing codes such as Dataglyph patterns, for example, are disclosed in U.S.

Pub. No. 2008/0148970, the disclosure of which is incorporated herein by reference in its entirety. The XReader™ system is an exemplary commercially available digital vision system for high-speed reading of DataGlyph, OCR, Data Matrix, barcodes, and other marks and patterns at high speeds which may be used. At S204, the batch can be separated into its constituent documents based on the identified document separators.

Having found either an L or R separator portion 20, 22 at S206, the method can proceed to S208. Optionally, at S206, if the total number of documents scanned is known and has been input to the system 42 by the scanning operator, the number of pages containing an L or R separator in the batch can be counted. If there are fewer counted pages than the input number of documents, this suggests that one of the separators has not been detected at S202. Any discrepancy between the number of stamped pages detected at S206 and the number of documents in the batch can be flagged and optionally at S212, the batch may be sent to a human operator for checking for stamps which have gone undetected.

If the number of documents is not input to the system, or if the error rate is sufficiently low that it is not worth the time spent reviewing all documents in a batch, the method simply proceeds to S208. Any missing separators can then be identified later, e.g., after the documents have been routed to the appropriate department for processing.

At S208, for all pages on which an L and/or R stamp is detected, a determination is made as to the location of the designated field 26 on the document, based on the relative or exact location(s) of the detected L and/or R portions 20, 22. Decoding of the stamp portion(s) 20, 22 may also return information about their exact location on the page, which can, in turn, be used to calculate the location of the designated field 26 and hence the expected location of the two digit document classification code 30, assuming one has been applied.

At S210, having identified the designated field 26, the region is extracted and examined for marks 30 on which a category assignment can be made. For example, OCR or ICR (intelligent character recognition) techniques may be used in an attempt to 'read' the code automatically from the calculated location, and set the category, as appropriate.

If the confidence level in the category assignment is below a threshold level, the document may be automatically routed to a human operator for manual intervention (S212), where the document code 30 is read from the display by the operator and entered e.g., by keying it in using input device 96. The entered information is returned to the system 42 and the method proceeds to S214.

At S214 further workflow processing of the now categorized and separated document may be performed, such as deskewing, assigning page numbers, keyword searching, wordspotting, and the like. The method then proceeds to S110 or, if there are more jobs 56 to be processed, may return to S202.

Some advantages for various aspects of the method are that 1) it eliminates the need for slip-sheets for document separation, allowing for notable cost savings and less wastage of materials; 2) it automates the extraction of the category number, which avoids the need, in most cases, for having an operator review the scanned document to extract that category number; 3) it provides a built-in redundancy by having two stamp portions "L" and "R" to improve document separation detection, without the need for an operator to apply the stamps separately.

In tests using one or two stamp portions, it was found that allowing detection of one or two stamp portions reduced errors. A Glyphstamp algorithm trained to look only for one candidate stamp portion 20 in the page had an error rate of 1.66%. By using an algorithm which finds one or the other or both stamp portions 20, 22, the error rate was reduced to 0.55%. It was found that these errors resulted from the Glyphstamp being partially cut off by the scanning process. This error could probably be reduced further by, for example, enlarging the body of the stamp device 10 and instructing operators to position the entire body over the hardcopy document 16 when stamping.

The method has been evaluated with various stamps having patterns, as follows:
1. Glyphstamp/Glyphstamp
2. Glyphstamp/text
3. Glyphstamp/Data Matrix
4. Single Glyphstamp A single small Glyphstamp 20 or 22 if properly applied, can be recognized with 99+% accuracy (based on analysis of 400 stamped pages). The recognition rate significantly improves with more than one pattern, improving recall. For example a 99.5% or more recall can be achieved with two Dataglyphs. This is advantageous when a large number of documents are being scanned since even one missed stamp in a batch of 100 documents means there is an error in the batch. Additionally, if one pattern is cut off or more lightly scanned or obscured in the scanning process, recognition can be based on one pattern only. The Glyphstamp/Glyphstamp includes an "L" and an "R" pattern. Both are decoded, thus ensuring no false positives. The redundancy helps improve results.

Glyphstamp/Data Matrix is similar, but leverages two different technologies. However, Data Matrix can be read by some scanning software (e.g., a DPU scan) and separated automatically. The Glyphstamps enable a second pass, to catch potential DPU scan errors and localize the designated field 26.

In the case of Glyphstamp/Text, where only one Glyphstamp is used, the Glyphstamp can be larger and contain more redundant information (and therefore have slightly better decoding rates). However, some of the text may be lost due to skew or improper scanning. Full text OCR may be performed on the text portion of the stamp, and if that string can be matched (with some fuzziness potentially), this may be a basis for inferring a stamp or sending to an operator for evaluation.

The method illustrated in FIGS. 4 and 5 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 4 and 5, can be used to implement the method for separating and categorizing documents.

The system and method find application in digital mailrooms and other applications where a forward scanning component is provided for importing work, such as folders of loan-related documents or the like.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for separating and categorizing documents comprising:
    manually stamping a page of each of a plurality of documents of a batch of documents with a document separator stamp comprising first and second machine recognizable patterns applied on a same page of the respective document, the first and second machine recognizable patterns being spaced by a designated field for receiving a handwritten user-applied category code, the first and second machine recognizable patterns defining left and right boundaries for the designated field;
    manually applying a category code to each document separator stamp, including handwriting the category code in the designated field;
    scanning the batch of the documents to form a scanned batch of documents, each document having a page having a document separator derived from the document separator stamp;
    processing the scanned batch of documents to identify pages that contain the document separator, the processing including identifying at least one of the first and second spaced patterns, with an algorithm which is capable of detecting both of the spaced patterns;
    for each of a plurality of document pages for which a document separator is identified:
        locating the corresponding designated field using a detected location of at least one of the spaced patterns; and
        identifying the category code associated with the designated field;
    separating the document containing the identified separator from other documents in the batch based on at least the identified separator; and
    assigning a document category from a set of document categories to the document, based on the identified category code; and
    wherein the processing, locating, identifying, separating and assigning are performed with a computer processor.

2. The method of claim 1, wherein the category code comprises two handwritten characters selected from letters, numbers and combinations thereof.

3. The method of claim 1, wherein the identifying of the category code associated with the designated field includes performing at least one of optical character recognition (OCR) and intelligent character recognition (ICR).

4. The method of claim 1, further comprising routing each of the documents in the batch of scanned documents based on the respective assigned category.

5. The method of claim 1, wherein at least one of the first and second patterns is selected from the group consisting of a Dataglyph code, a Data Matrix code; a barcode, and a text sequence.

6. The method of claim 5, wherein each of the first and second patterns is selected from the group consisting of a Dataglyph code and a Data Matrix code.

7. The method of claim 1, wherein the first and second patterns are spaced by a distance which is no more than four times a width of each of the patterns.

8. The method of claim 1, wherein the first and second patterns are spaced by a distance of no more than 8cm.

9. The method of claim 1, wherein the first and second patterns are arranged in parallel.

10. The method of claim 1, wherein the documents in the scanned batch are separated based solely on pairs of document separators with the exception of a last document in the batch.

11. The method of claim 1, wherein for each of a plurality of documents in the batch, the separating of the document from other documents in the batch includes designating a page with a first identified document separator thereon as a first page of the document and designating a page immediately prior to a next page with a second identified document separator thereon as a last page of the document.

12. The method of claim 1, further comprising generating the scanned batch of documents by scanning a batch of original documents to which the document separator stamps have been applied without inserting any separator pages between the original documents in the batch.

13. A computer program product comprising non-transitory media encoding instructions which when executed by a computer, perform the method of claim 1.

14. An apparatus for separating and categorizing documents comprising:
    memory storing instructions for performing the method of claim 1; and
    a processor in communication with the memory for executing the instructions.

15. The method of claim 1, further comprising, for a page in which first and second spaced patterns are detected, determining locations of the first and second spaced patterns on the page, the locating of the corresponding designated field including calculating the location of the designated field using the determined locations.

16. The method of claim 1, wherein an upper and lower boundary of the designated field are defined by a top and a bottom of the first and second machine recognizable patterns.

17. An apparatus for separating and categorizing documents comprising:
    memory which stores a batch of scanned documents, formed by manually stamping a page of each of a plurality of documents of a batch of documents with a document separator stamp comprising unique first and second machine recognizable patterns applied on a same page of the respective document, the first and second machine recognizable patterns having a height h, when applied to the original hardcopy documents, spaced by and defining left and right boundaries of a designated field of height h for receiving a handwritten user-applied category code, the first and second machine recognizable patterns defining left and right boundaries for the designated field, and a category code manually applied to each document separator stamp by handwriting the category code in the designated field, and scanning the batch of the documents to form the scanned batch of documents, each scanned document having a page having a document separator derived from the document separator stamp;

memory which stores:
- a separator detector for detecting the document separators on pages of the scanned documents, the separator detector configured for identifying the left and right spaced machine recognizable patterns;
- a region detector for locating the designated field based on a detected location of at least one of the spaced patterns output by the separator detector;
- a category detector which assigns a category to each document based on a user applied category code information extracted from the located designated field of a respective document separator; and
- a workflow processor for separating each document containing an identified separator from other documents in the batch based on at least the identified separator; and a computer processor which implements the separator detector, region detector, workflow processor, and category detector.

18. The apparatus of claim 17, further comprising an interface requester which outputs a page of a document to an associated graphical user interface for review by a person when the category detector is unable to assign a category to the document with at least a threshold confidence level.

19. The system of claim 17, wherein each of the first and second patterns is a two-dimensional barcode.

* * * * *